US008254542B2

(12) United States Patent
Frederick

(10) Patent No.: US 8,254,542 B2
(45) Date of Patent: Aug. 28, 2012

(54) PHONE KEY AUTHENTICATION

(75) Inventor: Carl R. Frederick, Newark, DE (US)

(73) Assignee: Bank of America Corporation, Charlotte, NC (US)

( * ) Notice: Subject to any disclaimer, the term of this patent is extended or adjusted under 35 U.S.C. 154(b) by 303 days.

(21) Appl. No.: 12/546,941

(22) Filed: Aug. 25, 2009

(65) Prior Publication Data
US 2011/0051909 A1    Mar. 3, 2011

(51) Int. Cl.
H04M 1/56 (2006.01)
H04M 1/64 (2006.01)

(52) U.S. Cl. .................. 379/142.05; 379/88.02

(58) Field of Classification Search ............ 379/88.01, 379/88.02, 88.17, 210.01, 114.04; 705/72; 455/415
See application file for complete search history.

(56) References Cited

U.S. PATENT DOCUMENTS

| | | | |
|---|---|---|---|
| 6,021,335 A | 2/2000 | Zicker | |
| 6,324,271 B1 | 11/2001 | Sawyer et al. | |
| 6,718,021 B2 * | 4/2004 | Crockett et al. | 379/93.23 |
| 7,149,296 B2 | 12/2006 | Brown | |
| 7,167,551 B2 | 1/2007 | Brown et al. | |
| 7,257,213 B1 | 8/2007 | Laljiani | |
| 7,382,867 B2 | 6/2008 | Smith | |
| 7,447,784 B2 | 11/2008 | Eun | |
| 2003/0108159 A1 | 6/2003 | Brown et al. | |
| 2003/0108163 A1 | 6/2003 | Brown et al. | |
| 2005/0129191 A1 * | 6/2005 | Kokko et al. | 379/88.13 |
| 2006/0212718 A1 | 9/2006 | Senga | |
| 2007/0143140 A1 * | 6/2007 | Ross et al. | 705/2 |
| 2007/0167688 A1 * | 7/2007 | Ross et al. | 600/300 |
| 2007/0183000 A1 * | 8/2007 | Eisen et al. | 358/452 |
| 2007/0220275 A1 | 9/2007 | Heitzeberg | |
| 2008/0010687 A1 | 1/2008 | Gonen | |
| 2008/0159488 A1 | 7/2008 | Raja | |
| 2009/0030718 A1 * | 1/2009 | Bengson | 705/1 |
| 2009/0144534 A1 * | 6/2009 | Calhoon et al. | 713/2 |
| 2009/0163188 A1 * | 6/2009 | Hiller | 455/414.3 |
| 2009/0210225 A1 * | 8/2009 | Simpson et al. | 704/235 |
| 2010/0054429 A1 * | 3/2010 | Tonini | 379/88.02 |
| 2011/0029341 A1 * | 2/2011 | Muse et al. | 705/7 |
| 2011/0099067 A1 * | 4/2011 | Cooper et al. | 705/14.53 |
| 2011/0129072 A1 * | 6/2011 | Knapp et al. | 379/88.13 |
| 2011/0161232 A1 * | 6/2011 | Brown | 705/71 |
| 2011/0162078 A1 * | 6/2011 | Taveau et al. | 726/26 |

FOREIGN PATENT DOCUMENTS

JP    2006259925 A    9/2006

OTHER PUBLICATIONS

Search Report and Written Opinion in International Patent Application No. PCT/US2010/045700, mailed Oct. 6, 2010.

* cited by examiner

*Primary Examiner* — Davetta W. Goins
*Assistant Examiner* — Mohammad Islam
(74) *Attorney, Agent, or Firm* — Banner & Witcoff, Ltd; Michael A. Springs

(57) ABSTRACT

A phone key registration process between a user and an institution directed to establishing an audible sound or a collection of audible sounds recognizable to a user and stored with the institution. Subsequent to establishing the phone key, when the institution calls the user, the registered phone key may be played back to the user allowing the user to authenticate that the calling party is, indeed, the institution which the user registered the phone key with. Such a process may prevent an unauthorized party without knowledge of the phone key to call a user acting as the institution to illegally obtain private or sensitive information.

21 Claims, 10 Drawing Sheets

PHONE KEY AUTHENTICATION

FIELD OF THE TECHNOLOGY

Aspects of the disclosure generally relate to providing audio playback to confirm the identification of a caller.

BACKGROUND

Many entities exist today whose goal is to fraudulently obtain private identification information of unsuspecting users for theft and other illicit purposes. For example, a caller imitating an authorized party may reach a user on a telephone line and attempt to trick the user into providing the unauthorized caller private identification information such as an account number, social security number, and the like. Once the identification information is obtained, the unauthorized caller may utilize the private information to access the unsuspecting user's financial accounts to steal funds, perform unauthorized activity, and the like.

To combat these fraud attempts, many users are educated to be very cautious about providing private identification information, but fraudulent callers pretending to be an authorized agent are still sometimes successful in tricking the user and obtaining the information.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

The various aspects described herein may be directed to providing an agreed upon method to establish credibility when an institution calls a customer regarding the customer's account. The presence of a secure method to establish credibility that both the institution and the customer know about reduces the chances that fraud will occur via an unauthorized party posing as the institution during a phone call. In one aspect, the customer may register a phone key only known to the customer and the institution. In all subsequent phone calls from the institution to the customer, the institution presents the phone key to the customer to indicate that the calling party, indeed, is the institution and not a fraudulent party. Without hearing the correct phone key, a customer receiving a call from an alleged representative of the institution may easily ascertain that the caller is unauthorized, and instead of providing sensitive information, the customer may contact the appropriate authorities for further investigation.

According to one aspect of the present disclosure, a user registers a phone key with an automated registration system associated with an entity such as a financial institution, a corporate business, and the like. Thereafter, each time the institution calls the user, the institution may playback the registered phone key to the user. Once the user hears the phone key and recognizes that the phone key is indeed the registered phone key, the user may provide additional information to authenticate the user to the calling party. After both the user and the calling party are authenticated, matters pertaining to the user's account may be discussed.

According to another aspect of the present disclosure, a user may register a phone key via a telephone as follows. The user may receive a call from an entity, and during the call, the user may receiving a one-time key that the user may have to provide back to the calling entity at a later time and a temporary key that may be played to the user at a later call thereby allowing the user to recognize that the calling party is the party that provide the user the temporary key. Thereafter, the user may receive another call from the entity, which may play the temporary key so that the user may authenticate the entity, and may prompt the user to provide the one-time key, upon which the user may register the phone key. The user may configure the phone key by selecting one or more sounds and tones from a library of sounds and tones provided to the user over the phone. Alternatively or additionally, the phone key may be a recording of the user's own voice and may be any word, phrase or sound that the user speaks into the telephone receiver. Still further, the phone key may include letters or numeric values entered through a telephone key pad. Any combination of the above types of phone keys may also be used in one or more arrangements. The user may be asked to confirm the phone key after selecting the key. In addition, the repeating of the phone key may assist the user in remembering and/or recognizing the phone key.

BRIEF DESCRIPTION OF THE DRAWINGS

Figure 1:
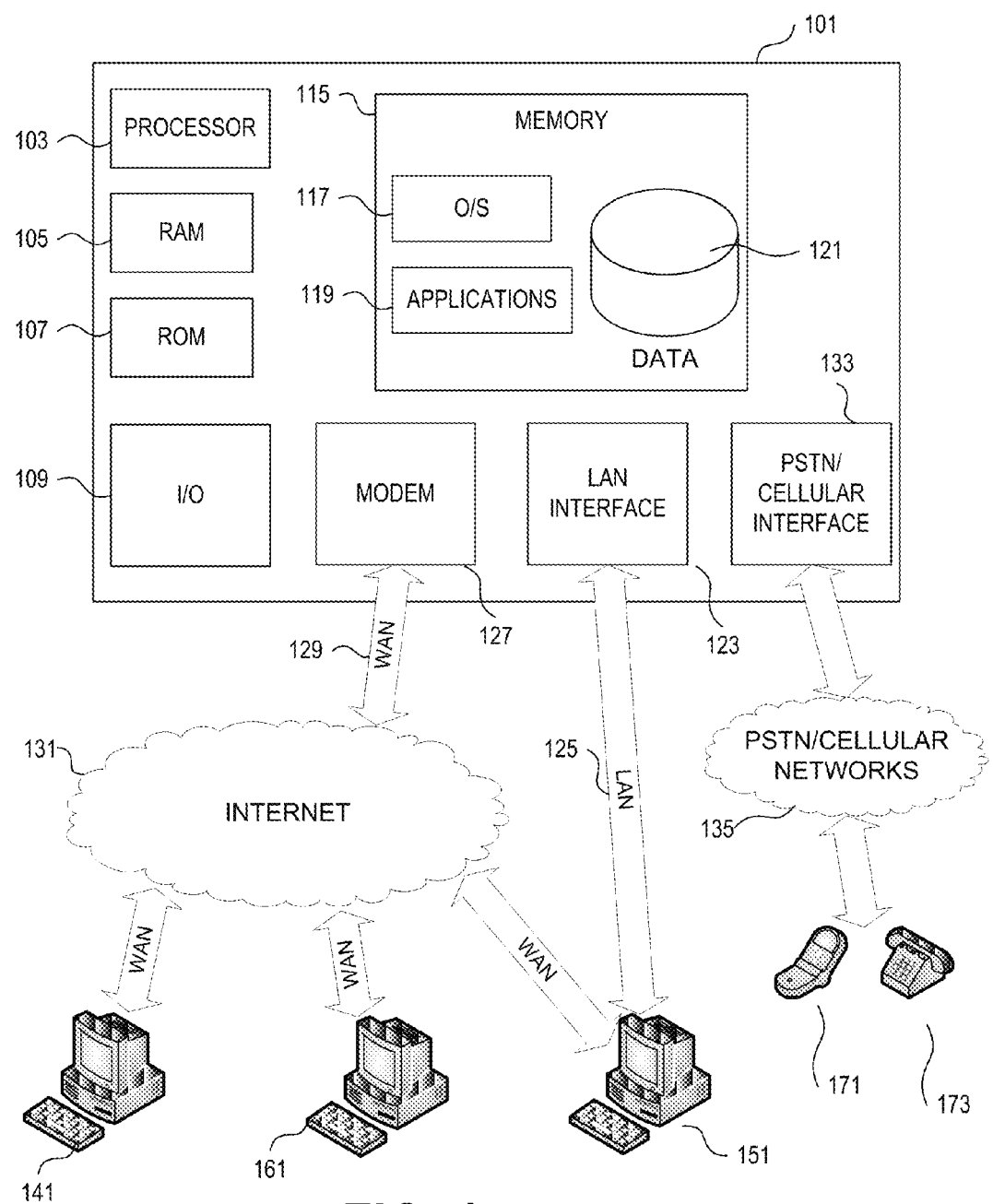

Having thus described the invention in general terms, reference will now be made to the accompanying drawings, which are not necessarily drawn to scale, and wherein:

FIG. 1 is a block diagram illustrating a computing device and network, in accordance with one or more aspects described herein.

Figure 2:
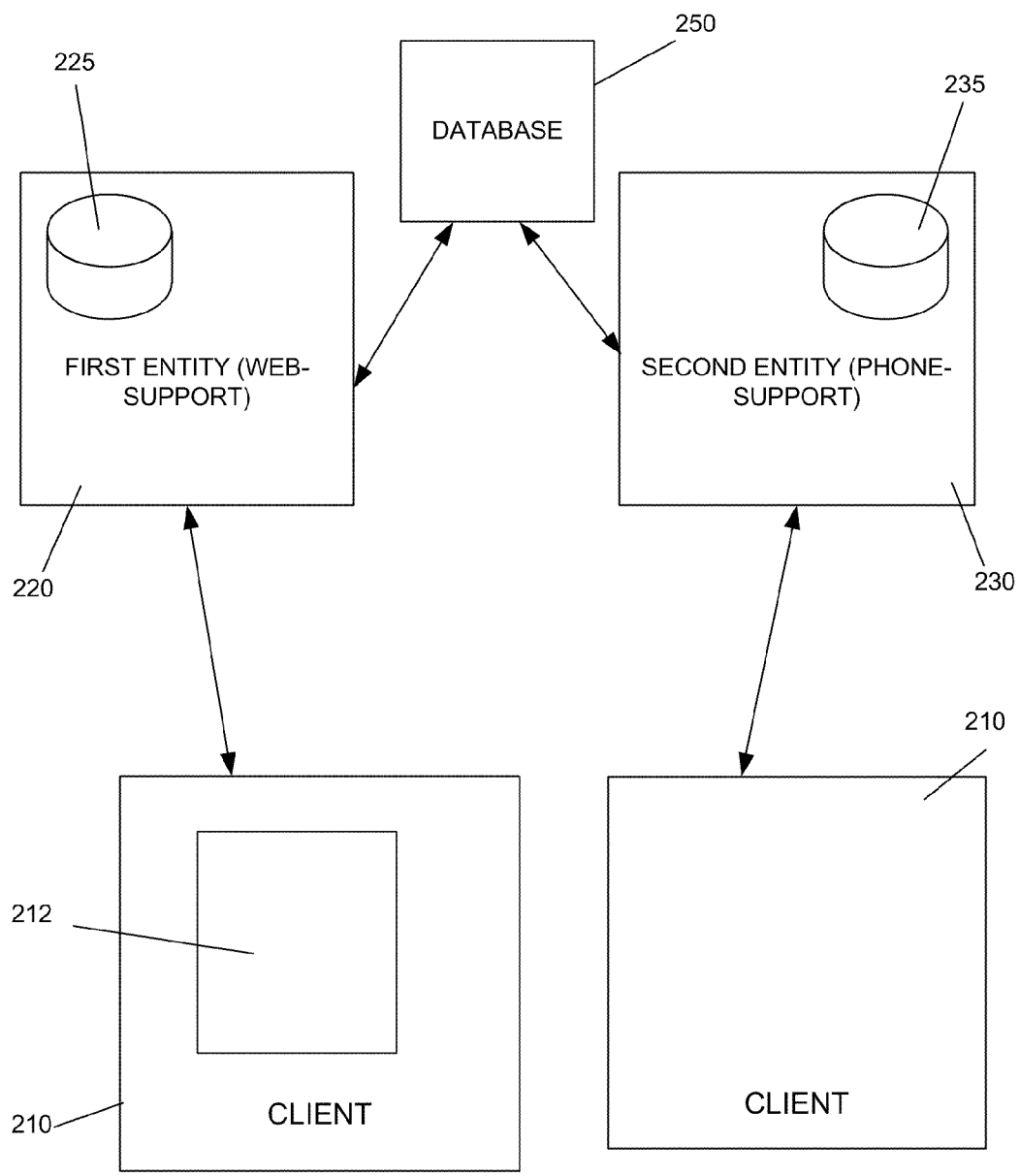

FIG. 2 is a block diagram showing illustrative components in a system for providing services to a user via a web site and/or a telephone line, in accordance with one or more aspects described herein.

Figure 3A:
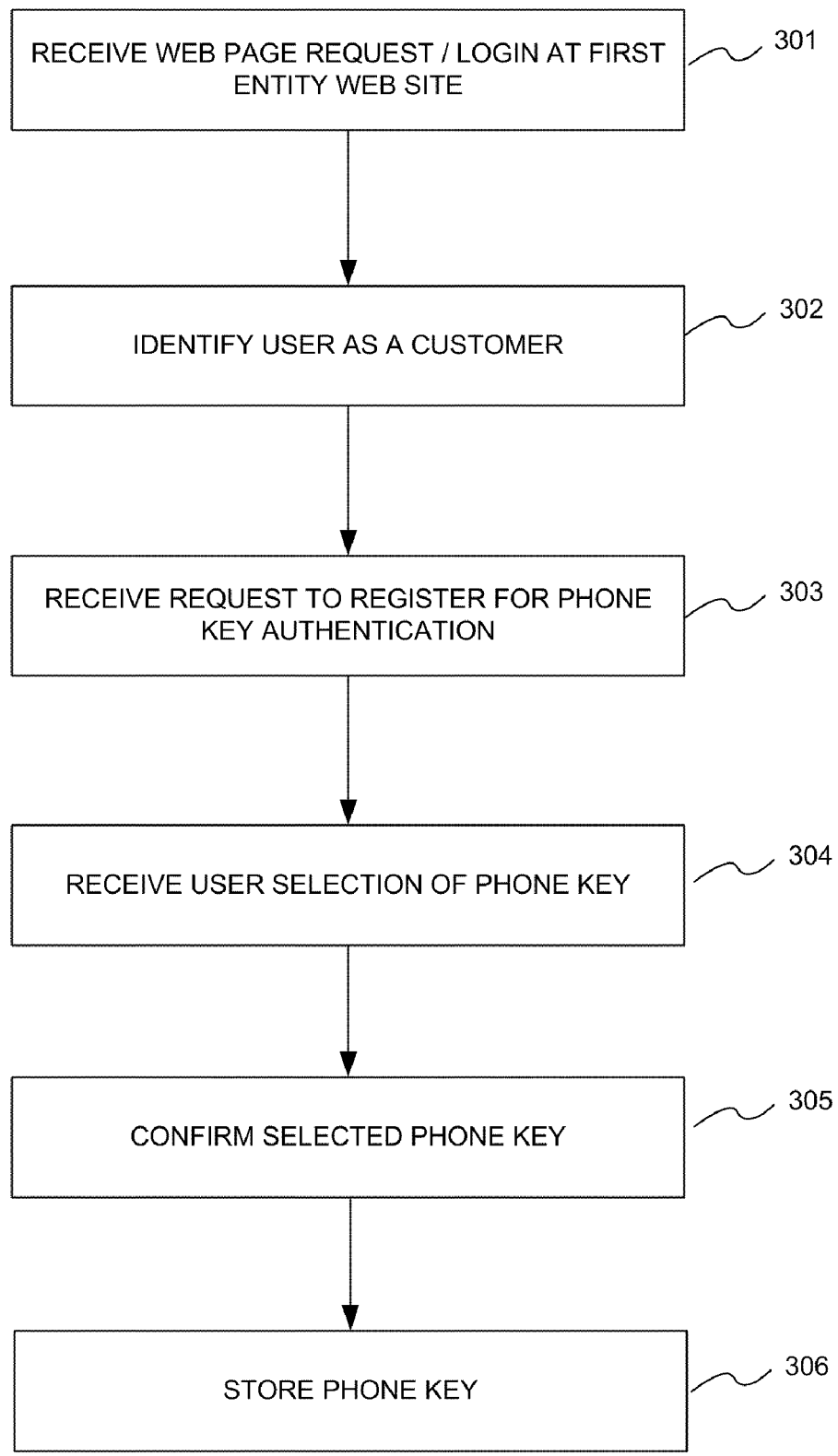

FIG. 3A is a flow diagram showing an illustrative method for registering a phone key using a web site in accordance with one or more aspects described herein.

Figure 3B:
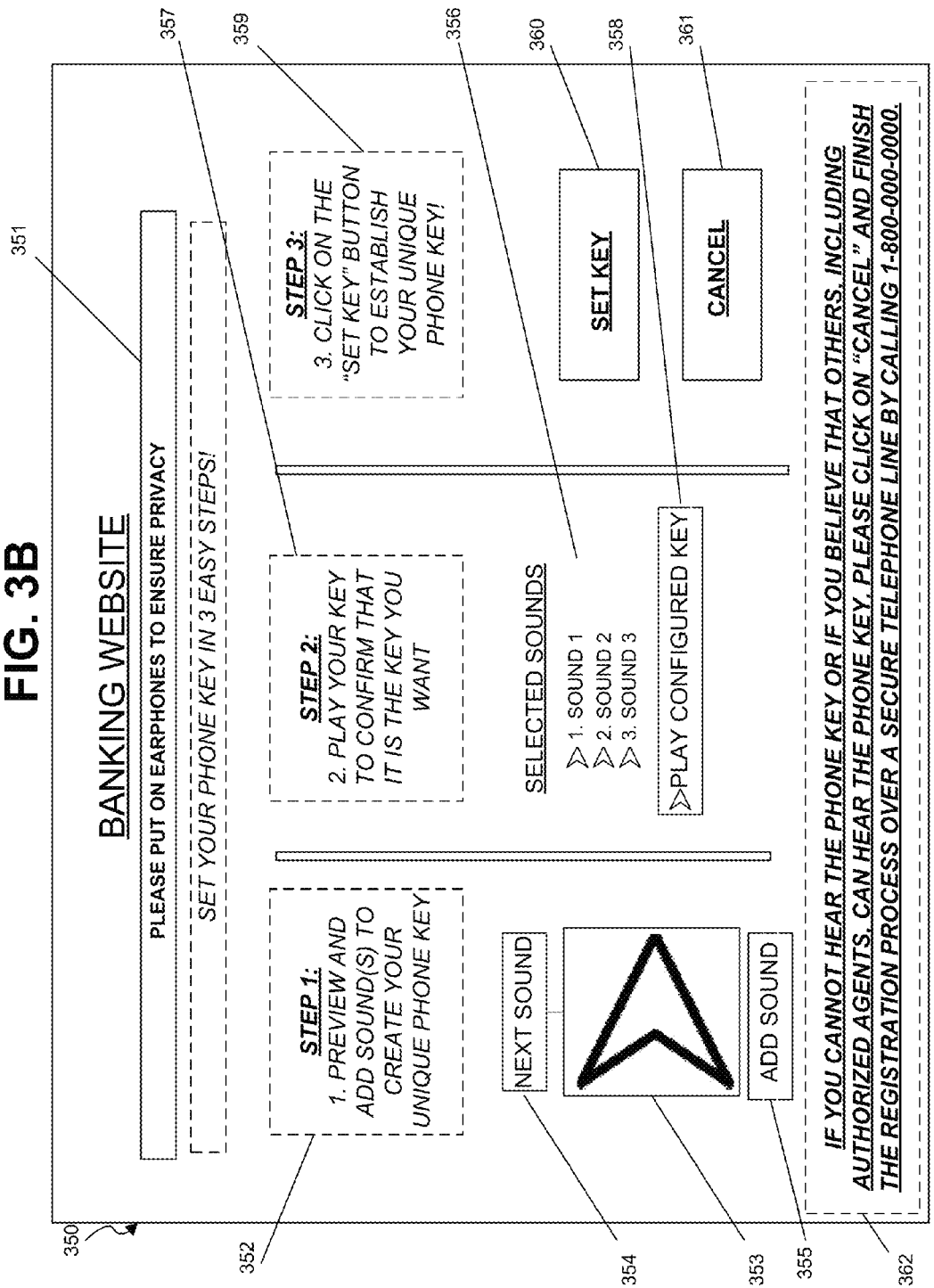

FIG. 3B is an illustrative user interface for registering a phone key using an online system in accordance with one or more aspects described herein.

Figure 4:
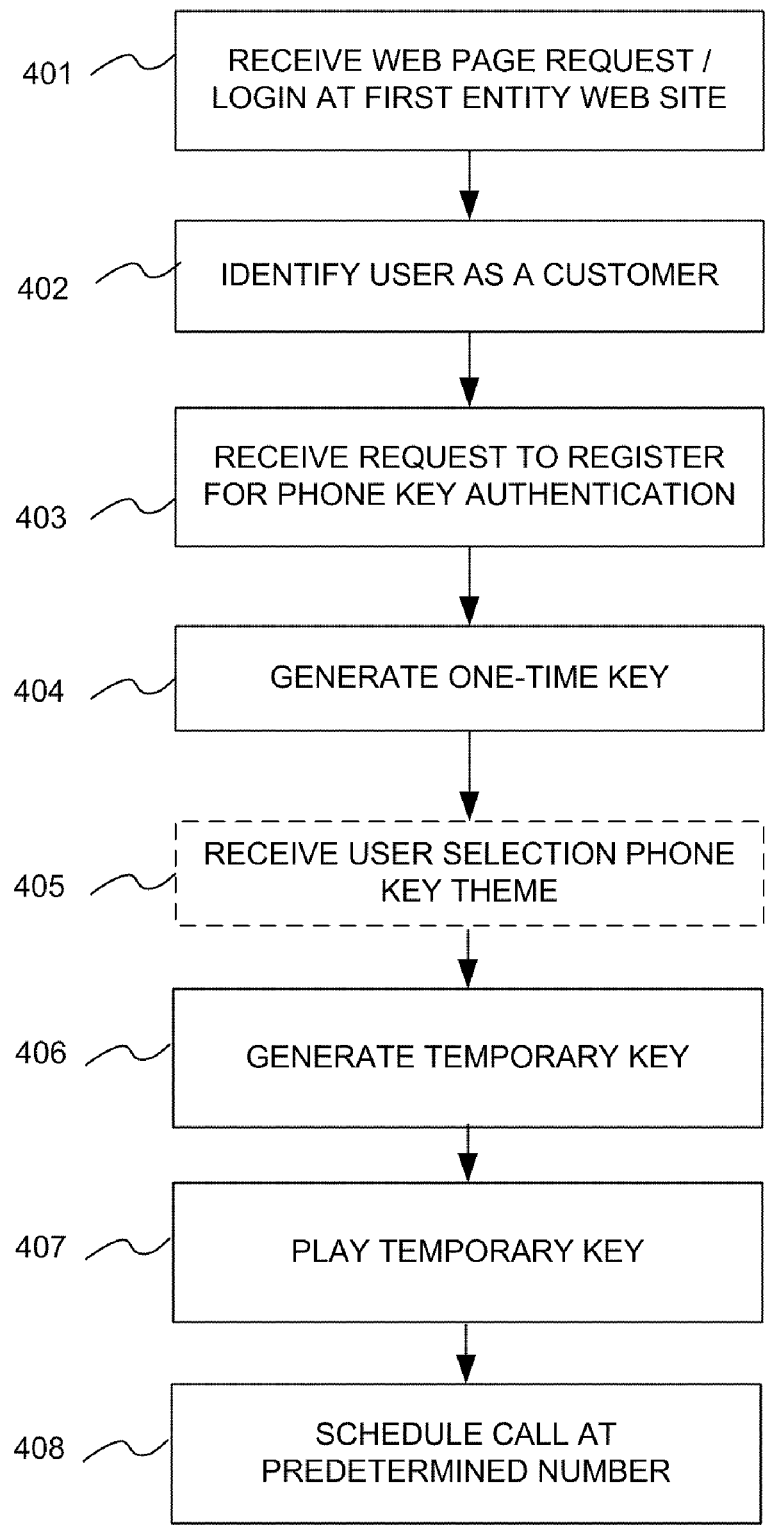

FIG. 4 is a flow diagram showing an illustrative method for generating a one time key using a web site in accordance with one or more aspects described herein.

Figure 5:
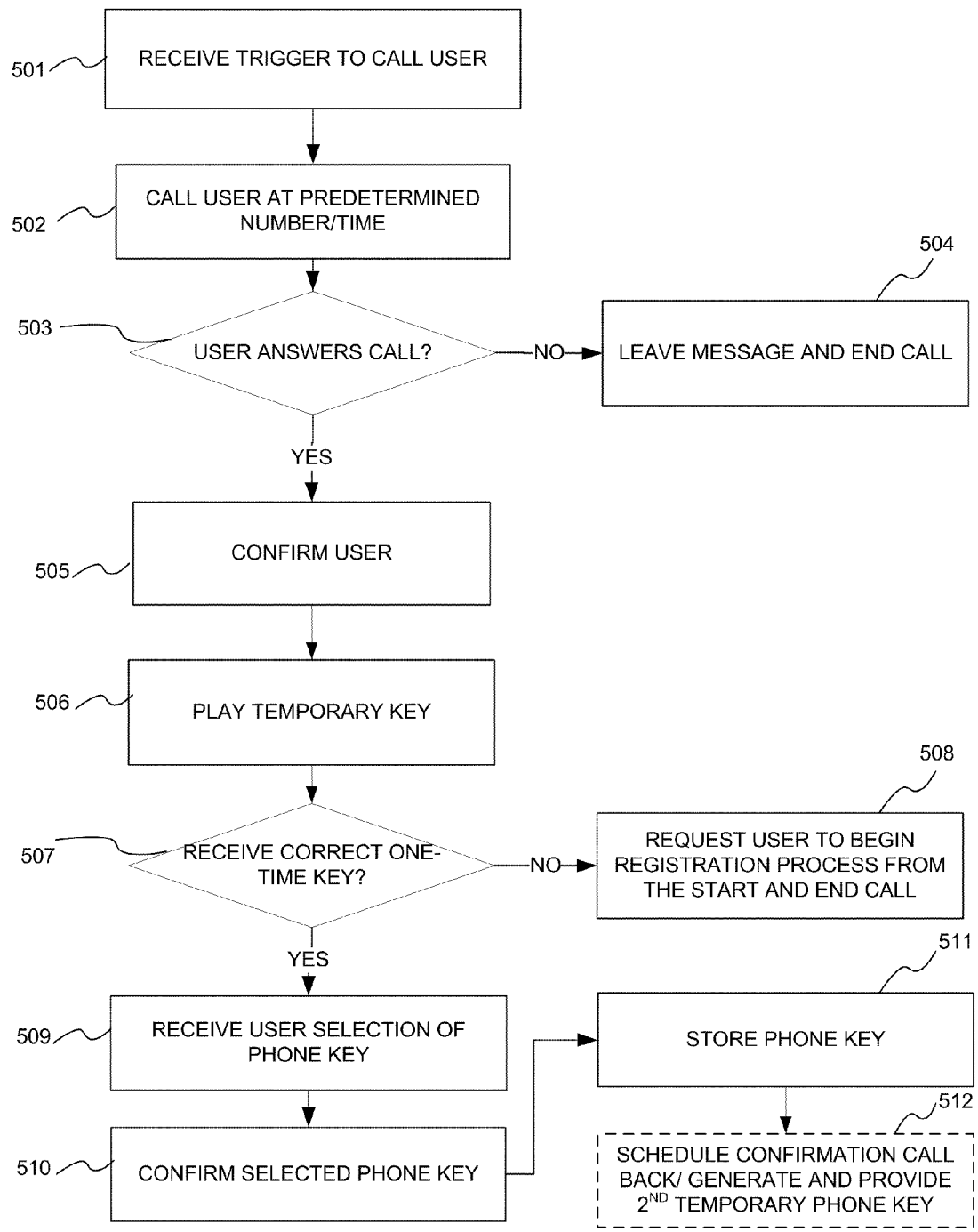

FIG. 5 is a flow diagram showing an illustrative method for registering a phone key over the phone in accordance with one or more aspects described herein.

Figure 6:
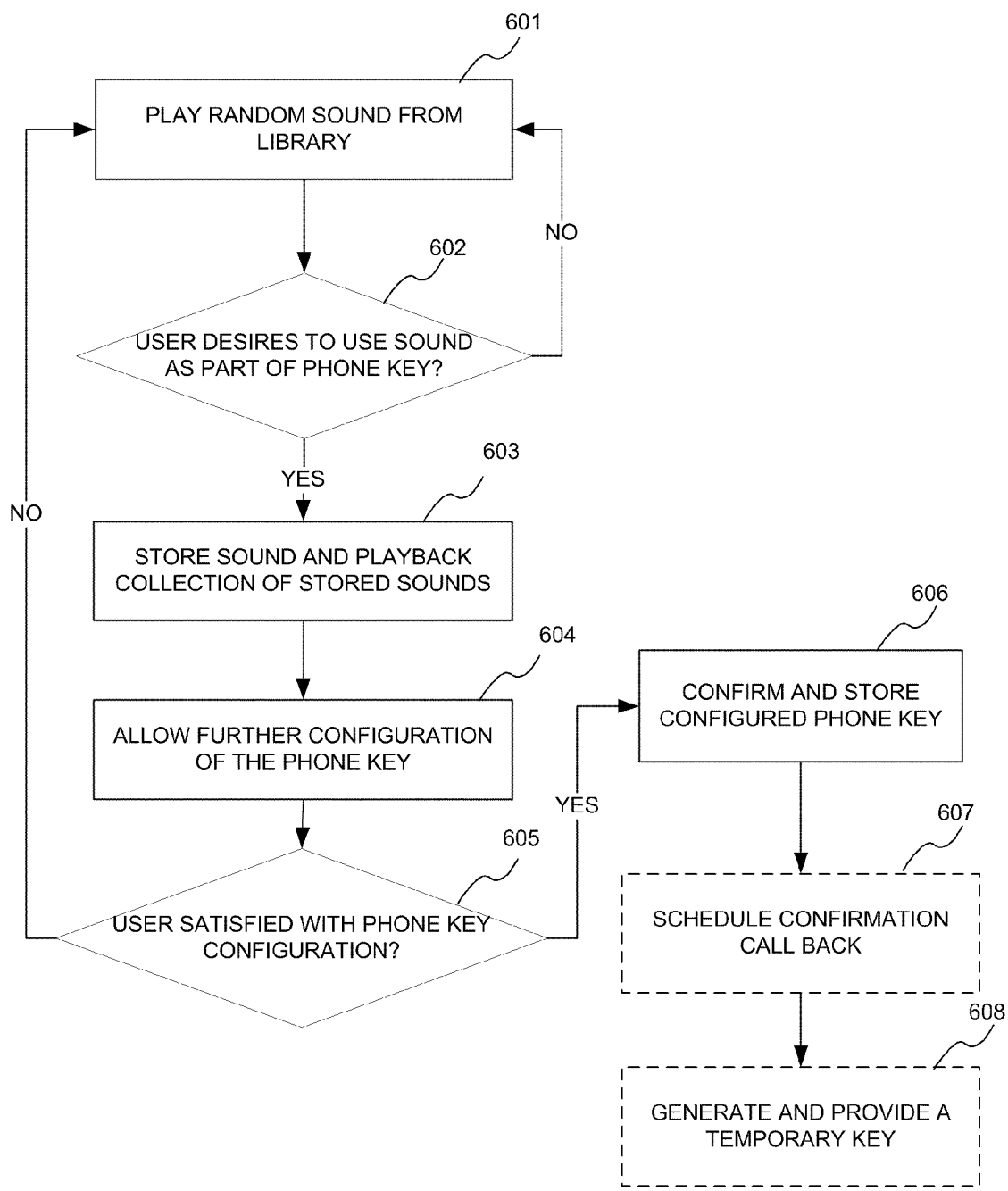

FIG. 6 is a flow diagram showing an illustrative method for playing sounds and configuring a phone key in accordance with one or more aspects described herein.

Figure 7:
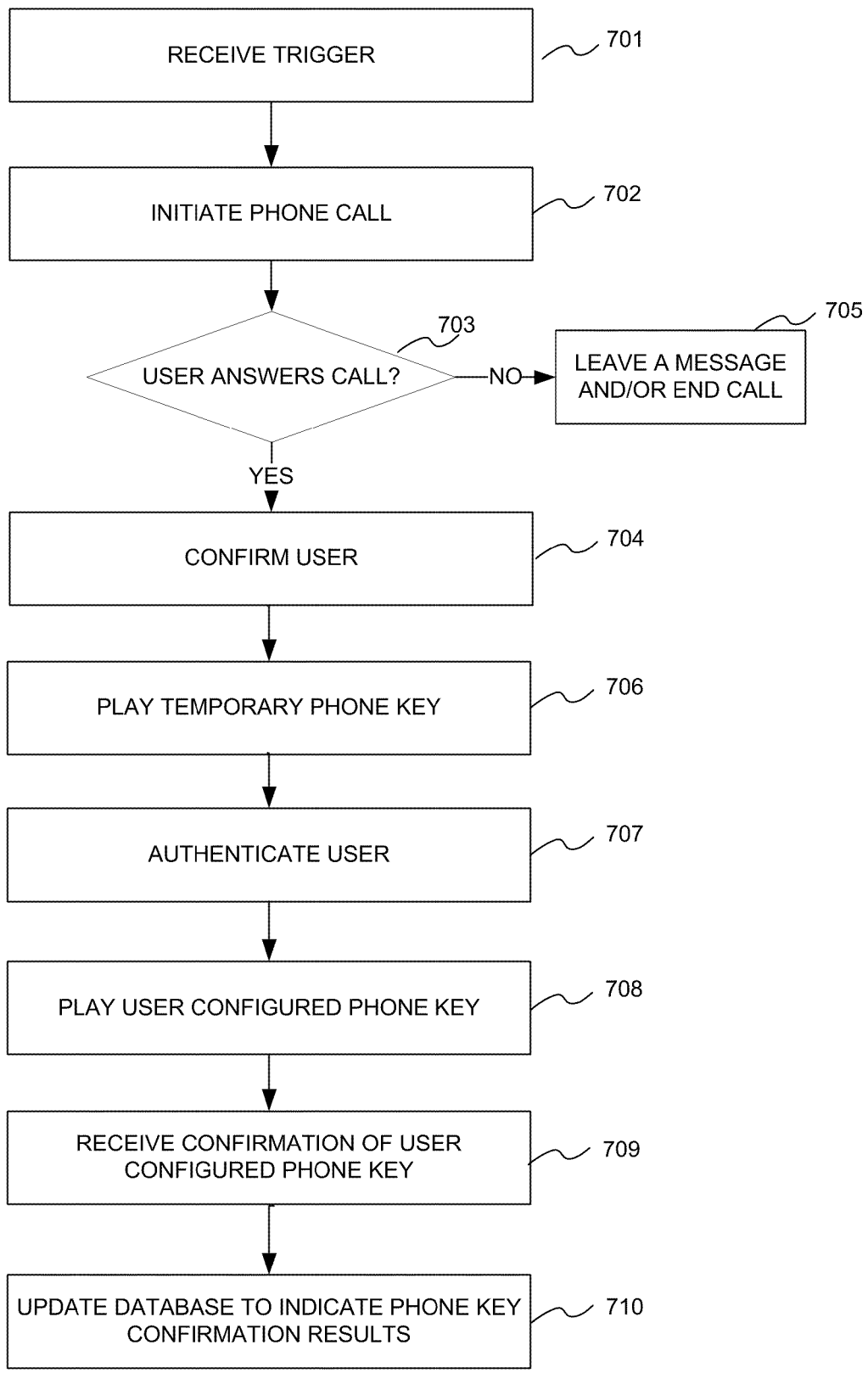

FIG. 7 is a flow diagram showing an illustrative method for confirming a registered phone key in accordance with one or more aspects described herein.

Figure 8:
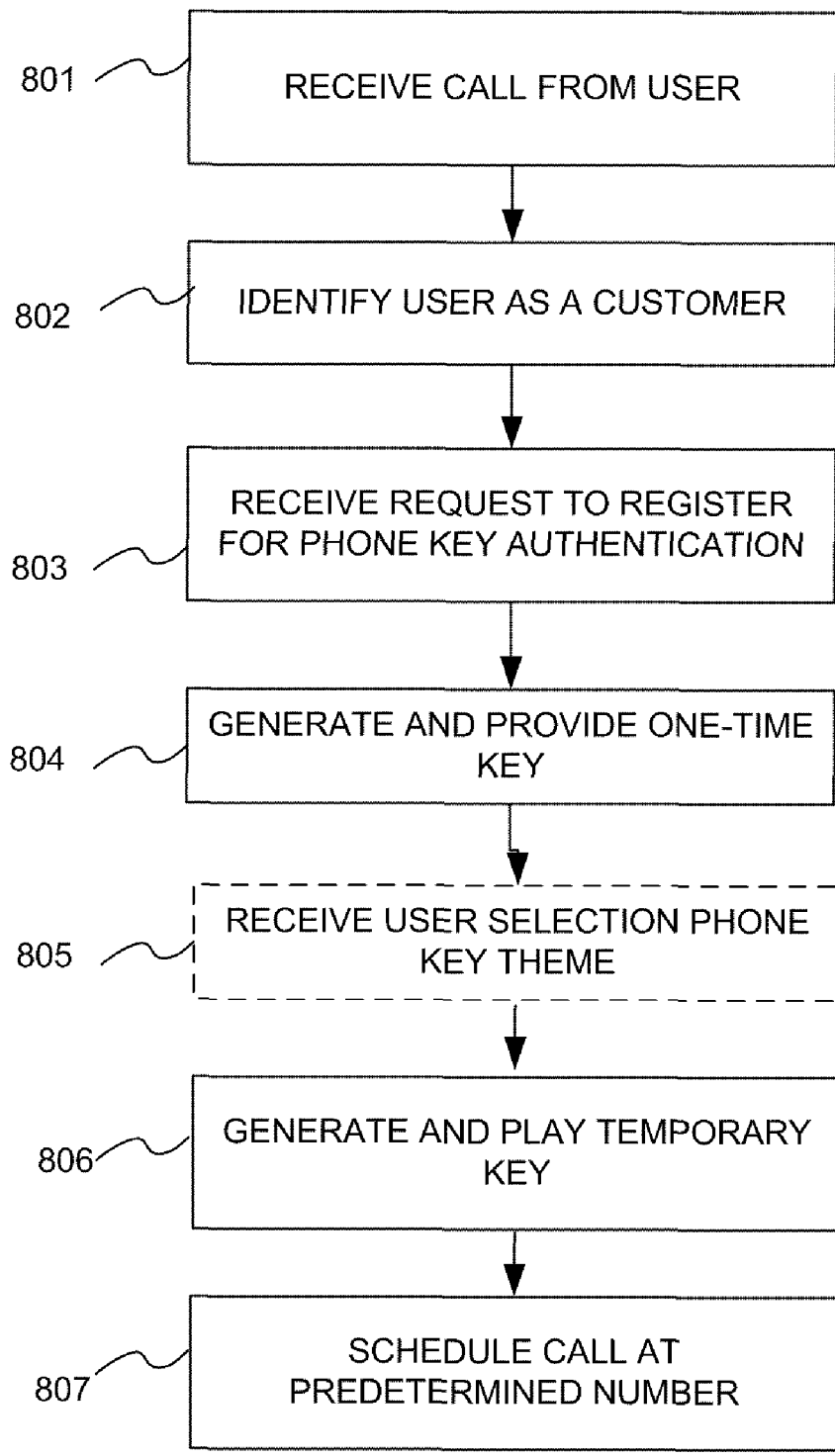

FIG. 8 is a flow diagram showing an illustrative method for generating a one time key using a phone system in accordance with one or more aspects described herein.

Figure 9:
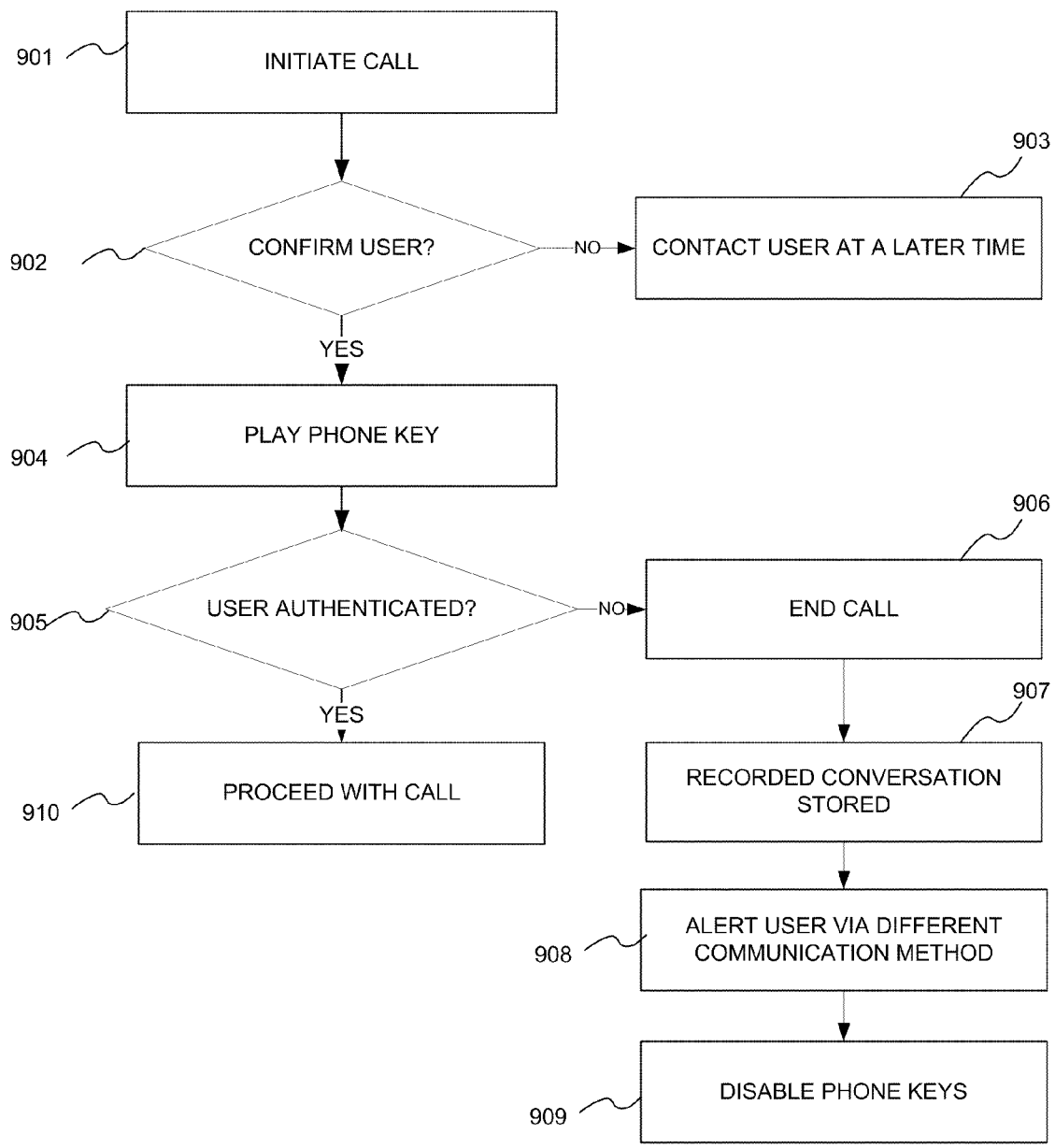

FIG. 9 is a flow diagram showing an illustrative method for an authentication exchange system in accordance with one or more aspects described herein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized. Moreover, structural and functional modifications may be made without departing from the scope and spirit of the present invention.

As will be appreciated by one of skill in the art upon reading the following disclosure, various aspects described herein may be embodied as a method, an apparatus, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates a block diagram of a generic computing device 101 (e.g., a client desktop or laptop computer, a mobile device, a computer server such as a web server, a data store providing services) that may be used according to an illustrative embodiment of the invention. The computer 101 may have a processor 103 for controlling overall operation of the server and its associated components, including RAM 105, ROM 107, input/output module 109, and memory 115.

I/O 109 may include a microphone, keypad, touch screen, and/or stylus through which a user of the computer 101 may provide input, and may also include one or more of a speaker for providing audio output and a video display device for providing textual, audiovisual and/or graphical output. Software may be stored within memory 115 and/or storage to provide instructions to processor 103 for enabling computer 101 to perform various functions. For example, memory 115 may store software used by the computer 101, such as an operating system 117, application programs 119, and an associated database 121. Alternatively, some or all of the computer executable instructions in computer 101 may be embodied in hardware or firmware (not shown). As described in detail below, the database 121 may provide centralized storage of account information and account holder information for the entire business, allowing interoperability between different elements of the business residing at different physical locations.

The computing device 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages. In addition, computing device 101 may communicate with terminals 141 and 151 via voice-over-internet protocol (VoIP) according to conventional techniques.

The computing device 101 may also communicate with mobile devices 171 such as cellular phones, personal digital assistants, and the like via interface 133 connected to cellular network 135. In addition, computing device 101 may communicate with land-line based telephone devices 173 via interface 133 connected to a public switched telephone network (PSTN) 135. Cellular/PSTN networks 135 may allow the computing device 101 to communicate with a user device such as a telephone using an automated spoken voice, a computer-generated recording, and the like. The computer device 101 may receive input from the user at the telephone via voice commands spoken by the user and/or keypad signals resulting from the user pressing number keys and the like on the telephone.

Additionally, an application program 119 used by the computer 101 according to an illustrative embodiment of the invention may include computer executable instructions for invoking user functionality related to communication, such as email, short message service (SMS), and voice input and speech recognition applications.

The services discussed herein may be provided, one example, on a website accessible by a user. Alternatively, the services may be provided using a telephone device.

Referring to FIG. 2, a component diagram of an illustrative system used to provide services to a user on a web site or a telephone is shown. The first entity 220 and/or the second entity 230 may correspond to any institution, including financial institutions. A financial institution refers to any entity storing or maintaining items or records of any currency, commodity, good, article of commerce or other items of value. Thus, a financial institution may be a traditional bank or other entity whose primary function is to store monetary funds and act as a payment agent for the borrowing and lending of its customers. However, the examples and inventive concepts described herein may also apply to other types of financial institutions, such as capital market banks, brokerage firms, credit providers (e.g., credit agencies, credit card companies), financial services firms, insurance companies, online payment service providers (e.g., PAYPAL®), and other organizations that deal in the management of monetary assets and currencies. Additionally, the examples described herein may relate to financial institutions that store and exchange other (non-monetary) commodities having value, for example, airline miles, hotel points, rental car points, event tickets, telephone minutes, or customer points based on purchases made at a business. Thus, a financial institution may also include any entity that awards, stores, exchanges, or redeems any of these types of points or other commodities for customers.

In this example, a client 210 requests and retrieves a web page 212 from a first entity 220. The client 210 may be, for example, a desktop or laptop computer with a browser software application, a mobile device or mobile phone with Internet capability, or any computing device from which a user can access web content. The content rendered on web page 212 may be provided by a web server of the first entity 220, for example, in response to a client web page request via the Internet 131 (FIG. 1). The web content received from first entity's web server 220 may comprise secure and/or non-secure data, and may be received by the client 210 via a Hypertext Transfer Protocol (HTTP) communication protocol (e.g., via Transmission Control Protocol (TCP) port 80) or an Hypertext Transfer Protocol Secure (HTTPS) communication protocol (e.g., via TCP port 443). The web page 212 may also include one or more of the complex content types well known within the web development field, such as, dynamic pages, scripting objects, forms, and other embedded objects (e.g., applets and embedded code invoking plug-in object functionality).

The web page 212 may include content received via the first entity 220 as well as content received via a database 250. As shown in FIG. 2, the first entity 220 may receive a web page request from the client 210, then request and receive relevant data from the database 250 (e.g., client data records), retrieve additional relevant data from its own records (e.g., client data records stored in database 225), and then generate and transmit a web page 212 back to the client combining both sets of data. In addition to combining two sets of data, the examples discussed below include several other possibilities for using different web content and services from the first entity 220 and database 250 in different ways when generating and providing the web page 212.

Alternatively, a client 210 may initiate a phone call to and/or receive a phone call from a second entity 230. The client 210 may be, for example, a mobile communication device such as a cellular phone, a Voice-over-Internet Protocol (VoIP)-enabled device such as a personal computer with an associated microphone and speaker, or, alternatively, the client 210 may be a land-line based telephone. The second entity 230 may be a computing device (e.g., computing device 101) configured to be capable of performing telephone communications and to communicate audible sounds playable on a user's telephonic device. A connection between the client device 210 and the second entity may be formed via a network such as a cellular network, the Internet, or a PSTN. Once the client device and the second entity is connected, spoken voice communication may be established between the client device 210 and the second entity 230.

The second entity 230 may request and receive relevant data from the database 250 (e.g., client data records), retrieve additional relevant data from its own records (e.g., client data records stored in database 225), and transmit information back to the client combining both sets of data in the form of a spoken voice. In addition to merely combining two set of data, the examples discussed below include several other possibilities for using different content and services from the second entity 230 and database 250 in different ways when the client device 210 is communicating with the second entity 230.

FIG. 3A illustrates a method for providing a web site 212 comprising one or more web pages by a first entity 220. The method illustrated in FIG. 3 may be performed at a branch office of the institution (e.g., on a bank kiosk) or outside the branch office where the user may be able to access the Internet, such as the user's home and the like. As discussed above, the steps of FIG. 3A may be described in reference to the illustrative component architecture of FIG. 2. At step 301, the computing device (e.g., computing device 101) may receive a web page request and log-in information from a user. At step 302, the computing device may identify the user as a customer by ascertaining that the log-in information (e.g., a user name and password) matches information stored. At step 303, the computing device may receive a request from the user indicating that the user desires to register for a phone key authentication service. For example, the user may selection a phone key registration option provided on the web page. At step 304, the computing device may receive user selection of a phone key, as illustratively shown in FIG. 3B, described below. The computing device may confirm the phone key with the user by, for example, playing the phone key back to the user at step 305. At step 306, the computing device may store the phone key.

FIG. 3B illustrates an interface 350 which may be utilized by the user to register a phone key. The interface may be a webpage generated by computing device 101 and displayed on a user's computer. The interface 350 may include an instruction 351 to put on earphones or headphones as to ensure that the phone keys are only heard by the user. The interface 350 may also include instructions for three steps. Step 1 352 may instruct the user to listen to various sounds by pressing the play button 353. The user may listen to different sounds by selecting the next sound button 354, may select a desired sound by pressing the add sound button 355. The user may select one or more sounds to be the user's phone key, and each selected sound may be indicated under the selected sounds section 356. Once the user has selected the desired sounds for the phone key, step 2 357 may instruct the user to confirm the phone key by pressing the play configured key button 358. In one aspect, the user may switch around the order of the selected sounds, add or delete selected sounds before progressing to step 3. Step 3 359 instructs the user to press the set key button 360 to set the phone key as confirmed in step 2. Alternatively, the user may press the cancel button 361 if the user is not satisfied with the phone key or desires to set the phone key at a later time. Interface 350 may also include an instruction box 362 which instructs the user to cancel the phone key selection process immediately and to call an authorized phone number if, for example, the user believes that others can hear the phone key or if the user cannot hear the phone key when the user presses buttons 353 or 358.

Alternatively, after the user clicks on cancel 361 or indicates that the user cannot hear the phone keys, the computing device may display an interface and textually describe or illustrate the phone key. For example, the computing device may select a phone key for the user (e.g., "a car horn" followed by "birds chirping"). In this instance, instead of playing the actual sounds of "a car horn" and "birds chirping", the computing device may instead describe using sounds using text displayed on the graphical interface. Similarly, such a process may be utilized to alternatively indicate to the user the one time key, and the like.

While the user may register the phone key online as illustrated in FIG. 3A, the user may alternatively choose to perform part of the registration process online, but perform the phone key selection portion of the registration process on a telephone. In one aspect, by splitting up the registration process, an unauthorized individual attempting to steal log-in information and knowledge of the phone key would find it more difficult to do so since the entire process is not performed at any one time and on any one machine.

FIG. 4 illustrates a web-based online registration method. At step 401, the user logs in to the website online by for example, providing a user log-in and password. At step 402, a computing device (e.g., computing device 101) identifies the user (e.g., the identification and password provided by a user matches stored information). At step 403, the computing device receives the request from the user indicating that the user desires to register for the phone key authentication service. At step 404, the computing device may generate a code such as a one-time key. The one-time key may be a collection of alphanumeric characters or any other sequence or collection of identifying marks that the user may have to input at a later time to proceed with the phone key registration process such as selection of a phone key. At step 405, the user may be requested to select a theme for the phone key. In one aspect, the theme may be a category of music such as blues, R&B, rock, classical and the like. At step 406, computing device may generate a temporary key to be used to validate the calling party to the user during the next phone call that the user receives prior to the phone key being registered. The temporary key, in one example, may be one or more sounds configured to be memorable to the user. In one aspect, the temporary key may be common sounds that the user may recognize such as birds chirping, bells ringing, spoken words and the like. At step 407, the computing device may play the generated temporary key to the user, and assist the user in memorizing the temporary key so that the user can recognize the temporary key at a later time. In a further aspect, the temporary key may be sounds that are all from a same genre (e.g., three musical sounds, two popular maxims, and the like). At step 408, the computing device may schedule a time and a phone number which the computing device may call the user to continue the registration process. In one aspect, the scheduled time may be immediately after step 407 and the phone number may be the contact number that is already associated with the user account.

FIG. 5 illustrates a calling process for continuing a phone key registration method. At step 501, the computing device (e.g., computer device 101) may receive a trigger that a particular user is scheduled to receive a call to continue the phone key registration method. The trigger may be, in one example, an alert that the computer device is scheduled to call the particular user at the current time. In response, the computing device may initiate a call to the user at a number previously specified at step 502. The computing device may determine whether a user answered the call at step 503. In one example, the computer may request that the user speak a particular phrase or press a particular button on the user's phone keypad to ascertain that the user, and not a voice message system, is answering the call. If a user does not answer the call, the computing device may attempt to leave a message on the user's voice message system at step 504 instructing the user to begin the registration process over again (e.g., by beginning with step 401 as described in FIG. 4). However, if a user answers the call, the computing device may confirm the user's name, or other basic, non-private information at step 505. At step 506, the computing device may play a temporary key previously generated and provided to the user so that the user can identify that the calling party indeed is the institution and not a fraudulent party. At step 507, the user is requested for the previously generated one-time key (e.g., as generated in step 404 of FIG. 4) and the computing device may receive input from the user. The computing device may access the user's record to determine whether the code entered by the user matches the one-time key previously generated and stored. If the one-time key is incorrect, the user may be given a predetermined number of chances to enter the correct one-time key before being instructed to begin the registration process over again at 508. However, if the code is correct, the user may be able to proceed to select the phone key over the phone at 509.

After the user selects the phone key at step 509, the phone key may be re-played to the user for confirmation of the phone key and to assist the user in remembering the phone key at step 510. At step 511, the phone key may be stored once the selection of the phone key has been confirmed. At step 512, in order to further assist the user in memorizing the phone key, the computing device may call back the user at a scheduled time and number to replay the phone key. In one aspect, the user may be instructed to repeat the process of selecting a phone key (and might not be allowed to select the exact same phone key) if the user does not receive a phone call or does not answer the call to confirm the phone key at the schedule time.

At step 512, the user may be provided a second temporary phone key different than the first temporary phone key. However, the second phone key may also be a collection of sounds recognizable to the user.

FIG. 6 illustrates a method of selecting a phone key through a telephonic device. At step 601, the computing device (e.g., computing device 101) may play a first sound selected from a library of sounds to the user over the phone. If previously, the user had inputted a preference for a category or genre of sound, the computing device may play sounds based on the user's preference. At step 602, the computing device may receive input from a user to indicate whether the user desires to have the played sound be part of the user's phone key. For example, the user may press the button corresponding to "1" on the phone keypad or speak the word "yes" to indicate that the user desires to select the played sound, and may press the button corresponding to "2" on the phone keypad or speak the word "no" to indicate that the user does not desire to select the played sound for usage as the phone key. If the user desires to select the played key, the computing device may store the key and playback all selected keys at step 603. Otherwise, if the user desires not to store the played key, the computing system may return to step 601 and play another key. The sounds selected to be played to the user may be performed by the computing device according to a non-random, non-uniform manner. For example, the computer may perform a selection algorithm to select sounds which may be memorable to the user. In another aspect, the sounds selected and played to one user might not be the same sounds selected and played to another user. Also, a purely random sound selection for playing to the user may lead the user to configure an obscure, hard-to-remember collection of sounds such as a string of spoken letters, "AGKYFPMZW". In another aspect, the computer may select the sounds randomly from a library to make it more difficult for a fraudulent party to figure out the sounds.

At step 604, the computing device may allow the user to configure the order of any stored keys or to remove one or more keys stored during the session. For example, the computing device may play an automated message asking if the user would like to change the order of the phone key. If the user answers "yes" or presses the corresponding button on the phone, the computing system may play the first stored sound and ask if the user desires to keep the first stored sound as the first sound in the order of the phone key. If the user answers "yes" or presses the corresponding button on the phone pad, the computing system may play the second stored sound and ask if the user desires to keep the second stored sound as the second sound in the order of the phone key. However, if the user answers "no" to whether the user desires to keep the first stored sound as the first sound in the order of sounds comprising the phone key, the computing device may play the second stored sound and ask if the user desires to make the second stored sound the first sound of in the order sounds comprising the phone key, and so forth. The computing device may proceed until the user desires to proceed with selecting additional sounds to add or the user is satisfied with the phone key.

At step 605, the computing device may determine if the user is satisfied with the phone key configuration. For example, the computing device may ask the user over the phone if the user is satisfied and may wait for a verbal response or for the user to press a button on the phone. If the user is not satisfied, the process may return to step 601 and the computing device may continue to play sounds and receive input on whether the played sound is to be included in the user's phone key until the user is satisfied with a collection of sounds (e.g., the user may press "3" to indicate that the user is satisfied with the selected sounds, or speak the word "satisfied"). After the computing device determines that the user is satisfied with the collection of sounds to be used as a phone key at step 605, the computing device may play back the selected phone key one or more times to confirm the phone key and to assist the user in memorizing the phone key in step 606. For example, the computing device may assist the user in memorization by repeatedly playing the phone key. At step 607, the computing device may further schedule a future call for playing of the phone key to further assist the user in memorizing the phone key. At step 608, if the computer schedules a future call, the computer may also generate and provide a temporary key.

In another aspect, the phone key library may consist of a plurality of sounds, each of which may be used as part of the phone key. For example, the sounds may be English words, foreign words, musical tones, or any other audible sound. Certain users may desire to utilize one sound from the library as a phone key for ease and simplicity, while other users may choose to select a plurality of sounds and configure the order of the sounds to form a more complex sound key which may be more difficult for a fraudulent party to reproduce. In another aspect, the library of sounds available for user selection in configuring the phone key might not be the same library of sounds utilized by the computing device in generating a temporary key. In yet another aspect, the each library of sounds may be sufficiently large such that a fraudulent party obtaining the library may still have a very difficult time pretending to be the entity because an endless number of sounds may be available in each library.

Alternatively, the user may choose to record the user's voice as the phone key. For example, the user may speak words or audible sounds into the user's phone to be recorded at the computing device. In another aspect, the user may select a collection of sounds and/or the user's voice recording for usage as the phone key. For example, the user may configure the phone key to be one sound played to the user by the recording device from the library of sounds followed by a brief message recorded in the user's own voice.

In one aspect, the user may select and configure more than one phone key. For example, the user may configure two phone keys, phone keys A and B. The first time the system calls the user after configuring of the phone key, phone key A may be played to the user. The next time the system calls the user, phone key B may be played. The third time the system calls the user, phone key A may be played again, and so forth. Such a method may allow the user to further detect anomalies and contact a fraud specialist if, for example, the user realizes that the user has heard phone key A played twice in a row, suggesting that user did not receive the call where the system played phone key B.

In another aspect, the phone key may be used in connection with another security technique. For example, if the phone call is placed to a user device supporting an application that provides a verification code communicated to or from the institution, the user may be able to determine whether the call originates from the institution by determining whether the verification code matches. In another example, if the user has an online banking account and has previously selected a graphical icon to be used as an authentication icon, the icon may be sent to the user's communication device to verify that the calling party is the institution.

FIG. 7 illustrates a method of confirming a phone key. At step 701, the computing device may receive a trigger to initiate a call the user at a predetermined phone number. The trigger may be, in one example, the user hanging up the phone after scheduling the call at step 608 of FIG. 6 or step 512 of FIG. 5. Alternatively, the trigger may be a determination that the current time matches a previously determined time that the computing system scheduled to call the user. At step 702, the computing device may initiate a phone call to the user at a predetermined phone number. At step 703, the computing device may detect whether the user answers the calls. If the user answers the call, the computing device may proceed to confirm the user at step 704 by, for example, asking the user to verify the user's name, otherwise the computing device may leave a spoken message requesting that the user begin the registration process from the start (step 705). After the user is confirmed, the temporary key previously generated and provided to the user (e.g., at step 608 of FIG. 6) may be played to the user at step 706. If the user recognizes the temporary phone key played at step 706, the user may provide the computing device requested authentication information at step 707. In one aspect, authenticating the user may include receiving the one-time key (e.g., provided in step 404 of FIG. 4).

Next, after the user is authenticated, the phone key previously selected by the user may be played back over the telephone at step 708. At step 709, the user may be asked to confirm the phone key. In one aspect, the user may be played various phone keys and asked to select the phone key that the user configured, for example, by using the method of FIG. 6, to ensure that the user recognizes the phone key configured and is not confirming because only one phone key is played to the user. Alternatively, the user is only played the configured phone key to prevent user confusion. At step 709, the user may also be provided an opportunity to change the phone key by, for example, returning to step 509 of FIG. 5. The results of the confirmation may be stored at step 710.

FIG. 8 illustrates a method of performing a phone key selection process via the phone only. At step 801, the user calls a phone number triggering the computing device to begin the phone key registration process. At step 802, a computing device (e.g., computing device 101) identifies the user (e.g., the identification and password provided by a user via the phone keypad or voice input matches stored information). At step 803, the computing device receives the request to register the phone key. At step 804, the computing device may generate a one-time key. The one-time key may be a collection of alphanumeric characters or any other sequence or collection of identifying marks that the user may have to input at a later time to proceed with the phone key registration process. In one aspect, the one time key may be provided to the user via an automated spoken voice. Alternatively, the one time key may be sent to the user's number via a SMS text message or to the user's email. At step 805, the computing device may receive a selection of a phone key theme. At step 806, the computing device may generate and play the user a temporary key. At step 807, the computing device may schedule a time and a phone number which the computing device may call the user to continue the registration process. In one aspect, the scheduled time may be immediately after step 807 and the phone number may be the contact number that is already associated with the user account or the number that the user is calling from. The steps as illustratively described in FIGS. 5, 6 and 7 may be further performed to complete the phone key selection process.

FIG. 9 illustrates a method of using the phone key to authenticate a call to a user after the user registers the phone key. At step 901, a call is placed by the computing device (e.g., computing device 101) to the user at a predetermined phone number. At step 902, the user is confirmed using public information such as a name. If the user is not confirmed, the results are recorded at step 903 and the user is called again at another time. However, if the user is confirmed, the phone key previously registered is played to the user at step 904. In one aspect, the user may be previously instructed to confirm that the phone key heard is the phone key that the user previously registered. For example, if the user does not recognize the phone key, the user may be suspicious that the calling party might not be the institution, but instead, may be an unauthorized user attempting to trick or scam the user. The user may have been previously instructed to handle these situations by proceeding with the call to obtain more information from the calling party suspected to be fraudulent (but under no circumstances provide the party with private information) and/or hanging up the phone and calling the authorities.

However, if the phone key is confirmed, the user may be asked to provide authentication information at step 905. Such information may include private information only known to the user such as a password, social security number, and the like. If the user is not authenticated, the call is ended immediately at step 906 and the entire conversation may be stored and sent to a fraud specialist at step 907. The failed authentication attempt may be indicative of an unauthorized user attempting to access the user's account. At step 908, the user may be alerted using a different method than calling the same number as performed at step 901. For example, an email or text message may be sent to the user, or a different phone number is called if an alternative phone number is stored in association with the user account. Alternatively, a notice may be placed the next time the user logs into his online account. At step 909, the registered phone keys may be disabled.

However, if the user provides information matching the stored authentication information at step 905, the call is authenticated and proceeds accordingly. In one aspect, the call may be routed to a live agent after authentication at step 910. By only routing the call to a live agent after the phone key is confirmed in step 904, the integrity of keeping the phone key between the user and the automated system is kept.

Alternatively, the phone call initiated (e.g., at step 901 of FIG. 9) may be performed by a live agent and routed to the computing device after the user is confirmed, but before the phone key is played to the user, thereby still preserving that the phone key is kept between the user and the automated system (e.g., computing device 101).

In another aspect, the date/time of the last successful phone call placed to the user may be provided to the user before or after the user hears the phone key. Such information may allow the user to detect anomalies and contact a fraud specialist for further investigation where the user believes that the system has recorded a last successful phone call not placed to the user.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

The invention claimed is:

1. A method comprising:
   receiving a request to register for phone key authentication with an institution at a request processing device;
   receiving, at the request processing device, a user selection of a phone key;
   storing the phone key; and
   providing the stored phone key to the user via a telephone network to allow the user to authenticate the institution when the institution calls the user.

2. The method of claim 1, further comprising:
   generating a one-time key;
   generating a temporary key;
   providing the one-time key to the user;
   playing the temporary key; and
   scheduling a time for making a phone call at a predetermined phone number with the user, wherein the user is requested to provide the one-time key at the scheduled time.

3. The method of claim 2, further comprising:
   calling the predetermined number at the scheduled time;
   determining whether the user answers the call;
   responsive to determining that the user answered the call, playing the temporary key;
   receiving the one-time key from the user; and
   confirming the selected phone key.

4. The method of claim 3, further comprising:
   scheduling a confirmation call with the user for calling the user at a future time;
   calling the user at the scheduled time;
   confirming the user;
   playing the phone key;
   receiving confirmation of the phone key from the user; and
   activating the phone key responsive to receiving the confirmation of the phone key.

5. The method of claim 1, wherein the step of receiving the user selection of a phone key further includes:
   selecting a sound from a library of sounds;
   playing the selected sound;
   determining whether the user has selected the played sound to be part of the user's phone key;
   responsive to determining that the user has selected the played sound to be part of the user's phone key, playing the phone key including the played sound;
   allowing the user to further configure the phone key;
   responsive to determining that the user has selected to add another sound to be part of the user's phone key, selecting another sound from the library of sounds;
   playing the other sound;
   determining whether the user has selected the other sound to be part of the user's phone key;
   responsive to determining that the user has selected the another sound to be part of the user's phone key, playing the phone key including the played sound and the other sound; and
   confirming the selected phone key.

6. The method of claim 1, wherein the request is received via an online website.

7. The claim of claim 1, wherein the request is received via a telephone call.

8. The method of claim 1, further comprising:
   receiving a selection of a theme for the phone key from the user.

9. The method of claim 1, wherein the phone key comprises a recording of the user's voice.

10. The method of claim 1, further comprising:
    receiving a user selection of a plurality of phone keys, the plurality of phone keys comprising the phone key; and
    the institution calling the user a plurality of times using a corresponding one of the plurality of phone keys in a rotational fashion.

11. The method of claim 1, further comprising:
    providing a plurality of phone keys to the user, the plurality of phone keys comprising the phone key; and
    requesting the user to choose the phone key from the provided plurality of phone keys.

12. An apparatus comprising:
a processor; and
a memory storing instructions that when executed by the processor, cause the apparatus to:
receive a request to register for phone key authentication with an institution;
receive a user selection of a phone key;
store the phone key; and
provide the stored phone key to the user via a telephone network when the institution calls the user to allow the user to authenticate the institution.

13. The apparatus of claim 12, wherein the memory further stores instructions that when executed by the processor, cause the apparatus to:
generate a one-time key;
generate a temporary key;
provide the one-time key to the user;
play the temporary key; and
schedule a time for making a phone call at a predetermined phone number with the user, wherein the user is requested to provide the one-time key at the scheduled time.

14. The apparatus of claim 13, wherein the memory further stores instructions that when executed by the processor, cause the apparatus to:
call the predetermined number at the scheduled time;
determine whether the user answers the call;
responsive to determining that the user answered the call, playing the temporary key;
receive the one-time key from the user; and
confirm the selected phone key.

15. The apparatus of claim 14, wherein the memory further stores instructions that when executed by the processor, cause the apparatus to perform the method of:
scheduling a confirmation call with the user for calling the user at a future time;
calling the user at the scheduled time;
confirming the user;
playing the phone key;
receiving confirmation of the phone key; and
activating the phone key responsive to receiving the confirmation of the phone key.

16. The apparatus of claim 12, wherein the memory further stores instructions that when executed by the processor, cause the apparatus to perform the method of:
selecting a sound from a library of sounds;
playing the selected sound;
allowing the user to further configure the phone key;
responsive to determining that the user has selected the played sound to be part of the user's phone key, playing the phone key including the played sound;
determining whether the user has selected to add another sound to be part of the user's phone key;
responsive to determining that the user has selected to add another sound to be part of the user's phone key, selecting another sound from the library of sounds;
playing the another sound;
determining whether the user has selected the another sound to be part of the user's phone key;
responsive to determining that the user has selected the another sound to be part of the user's phone key, playing the phone key including the played sound and the another sound;
and
confirming the selected phone key.

17. A non-transitory computer readable medium storing computer readable instructions, that when executed, cause an apparatus to perform:
receiving a request to register for phone key authentication with an institution;
receiving user selection of a phone key;
storing of the phone key; and
providing the stored phone key to the user via a telephone network when the institution calls the user to allow the user to authenticate the institution.

18. The non-transitory computer readable medium of claim 17, further storing instructions, that when executed, cause the apparatus to further perform the method of:
generating a one-time key;
generating a temporary key;
providing the one-time key to the user;
playing the temporary key; and
scheduling a time for making a phone call at a predetermined phone number with the user, wherein the user is requested to provide the one-time key at the scheduled time.

19. The non-transitory computer readable medium of claim 18, further storing instructions, that when executed, cause the apparatus to further perform the method of:
calling the predetermined number at the scheduled time;
determining whether the user answers the call;
responsive to determining that the user answered the call, playing the temporary key;
receiving the one-time key from the user; and
confirming the selected phone key.

20. The non-transitory computer readable medium of claim 19, further storing instructions, that when executed, cause the apparatus to further perform the method of:
scheduling a confirmation call with the user for calling the user at a future time;
calling the user at the scheduled time;
confirming the user;
playing the phone key;
receiving confirmation of the phone key; and
activating the phone key responsive to receiving the confirmation of the phone key.

21. The non-transitory computer readable medium of claim 17, further storing instructions, that when executed, cause the apparatus to further perform the method of:
selecting a sound from a library of sounds;
playing the selected sound;
allowing the user to further configure the phone key;
responsive to determining that the user has selected the played sound to be part of the user's phone key, playing the phone key including the played sound;
determining whether the user has selected to add another sound to be part of the user's phone key;
responsive to determining that the user has selected to add another sound to be part of the user's phone key, selecting another sound from the library of sounds;
playing the another sound;
determining whether the user has selected the another sound to be part of the user's phone key;
responsive to determining that the user has selected the another sound to be part of the user's phone key, playing the phone key including the played sound and the another sound; and
confirming the selected phone key.

* * * * *